US009571688B2

(12) United States Patent
Murotani et al.

(10) Patent No.: US 9,571,688 B2
(45) Date of Patent: Feb. 14, 2017

(54) OPTICAL SCANNING APPARATUS AND IMAGE FORMING APPARATUS INCLUDING THE SAME

(71) Applicant: CANON KABUSHIKI KAISHA, Tokyo (JP)

(72) Inventors: Taku Murotani, Mishima (JP); Kunihiro Niwa, Mishima (JP); Junya Azami, Mishima (JP); Tetsuya Nishiguchi, Tagata-gun (JP); Hisanori Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/195,185

(22) Filed: Jun. 28, 2016

(65) Prior Publication Data

US 2016/0309053 A1 Oct. 20, 2016

Related U.S. Application Data

(63) Continuation of application No. 14/103,178, filed on Dec. 11, 2013, now Pat. No. 9,405,117.

(30) Foreign Application Priority Data

Dec. 13, 2012 (JP) ................................ 2012-272622
Dec. 4, 2013 (JP) ................................ 2013-251041

(51) Int. Cl.
*G02B 26/08* (2006.01)
*G02B 26/10* (2006.01)
*G02B 26/12* (2006.01)
*H04N 1/024* (2006.01)
*H04N 1/113* (2006.01)

(52) U.S. Cl.
CPC ........ *H04N 1/02481* (2013.01); *G02B 26/123* (2013.01); *H04N 1/113* (2013.01)

(58) Field of Classification Search
CPC ... G02B 26/123; G02B 26/125; G02B 26/124; G02B 26/10; G02B 26/121; G02B 26/08; G02B 26/101; G02B 26/105
USPC .......................................... 359/204.1–204.5
See application file for complete search history.

(56) References Cited

U.S. PATENT DOCUMENTS

2010/0033790 A1* 2/2010 Obara .................... B41J 2/473
359/204.1

\* cited by examiner

*Primary Examiner* — Mahidere Sahle
(74) *Attorney, Agent, or Firm* — Canon USA, Inc. IP Division

(57) ABSTRACT

An optical scanning apparatus includes first and second light source units including respective light sources; a rotating polygon mirror that performs deflection scanning of laser beams emitted from the light sources included in the first and second light source units; and a positioning member including a first abutting portion on which the first light source unit abuts and a second abutting portion on which the second light source unit abuts, the positioning member positioning the first and second light source units. The first and second light source units are positioned by the positioning member and arranged next to each other in a rotation axis direction of the rotating polygon mirror. The positioning member is a single member disposed between the first and second light source units in the rotation axis direction.

10 Claims, 16 Drawing Sheets

OPTICAL SCANNING APPARATUS AND IMAGE FORMING APPARATUS INCLUDING THE SAME

CROSS REFERENCE

This application claims the benefit of U.S. patent application Ser. No. 14/103,178 filed Dec. 11, 2014, which claims the benefit of Japanese Patent Application No. 2012-272622 filed Dec. 13, 2012 and No. 2013-251041 filed Dec. 4, 2013, all of which are hereby incorporated by reference herein in their entirety.

BACKGROUND OF THE INVENTION

Field of the Invention

The present invention relates to an optical scanning apparatus included in an electrophotographic image forming apparatus, such as a laser printer or a digital copier.

Description of the Related Art

An example of an optical scanning apparatus included in an electrophotographic image forming apparatus is structured such that a plurality of light source units are supported in an optical box. Japanese Patent Laid-Open No. 2008-268239 discloses a method for positioning and securing light source units when the light source units are arranged in a rotation axis direction of a rotating polygon mirror. FIG. 14 is a perspective view of a part of an optical scanning apparatus disclosed in Japanese Patent Laid-Open No. 2008-268239. As illustrated in FIG. 14, a tunnel-shaped hollow region is formed in a side surface of an optical box 79, and a plurality of light source units 71K and 71M are arranged close to each other in the Z direction (rotation axis direction) in the hollow region. Positioning in the Z direction is achieved as follows. That is, the light source unit 71K is positioned by causing a cylindrical portion of a light source holder 72K to abut on an abutting portion 76K formed on a positioning unit 79a of the optical box 79. Similarly, the light source unit 71M is positioned by causing a cylindrical portion of a light source holder 72M to abut on an abutting portion 76M formed on a positioning unit 79b of the optical box 79.

Positioning in the main scanning direction (Y direction) is achieved by causing the cylindrical portions of the light source holders 72K and 72M of the light source units 71K and 71M to abut on the abutting portions 75K and 75M, respectively, of the optical box 79. The light source holders 72K and 72M are fixed to the optical box 79 by pressing the light source holders 72K and 72M against the abutting portions 75K, 75M, 76K, and 76M with springs 77 in directions shown by arrows U1 and U2.

In order for the abutting portions 76K and 76M to achieve sufficient positioning accuracy, the two positioning units 79a and 79b having the abutting portions 76K and 76M of the optical box 79 need to have certain thickness and strength so as not to easily deform when the light source units 71K and 71M abut thereon.

The positioning units 79a and 79b are disposed outside the light source units 71K and 71M, respectively, in the rotation axis direction of a rotating polygon mirror. Therefore, when the positioning units 79a and 79b of the optical box 79 are formed so as to have certain strength, the size of the optical box 79 in the rotation axis direction of the rotating polygon mirror is increased. As a result, the size of the optical scanning apparatus and the size of an image forming apparatus including the optical scanning apparatus are increased.

SUMMARY OF THE INVENTION

Accordingly, the present invention provides a technology for suppressing increase in size of a positioning member, such as an optical box, including positioning units for positioning light source units in a rotation axis direction of a rotating polygon mirror.

An aspect of the present invention provides an optical scanning apparatus including first and second light source units including respective light sources; a rotating polygon mirror that performs deflection scanning of laser beams emitted from the light sources included in the first and second light source units; and a positioning member including a first abutting portion on which the first light source unit abuts and a second abutting portion on which the second light source unit abuts, the positioning member positioning the first and second light source units. The first and second light source units are positioned by the positioning member and arranged next to each other in a rotation axis direction of the rotating polygon mirror. The positioning member is a single member disposed between the first and second light source units in the rotation axis direction.

Further features of the present invention will become apparent from the following description of exemplary embodiments with reference to the attached drawings.

DESCRIPTION OF THE EMBODIMENTS

Optical scanning apparatuses according to embodiments of the present invention will now be described. Dimensions, materials, shapes, arrangements, etc., of components described in the embodiments may be changed as appropriate in accordance with the structure of the apparatus to which the present invention is applied and various conditions, and the embodiments described below are not intended to limit the scope of the present invention. In the following description of the embodiments, components having similar structures, such as "light sources 1A, 1B, 1C, and 1D", may be referred to generically as, for example, "light sources 1".

First Embodiment

Overall Structure of Image Forming Apparatus 100

Figure 16:
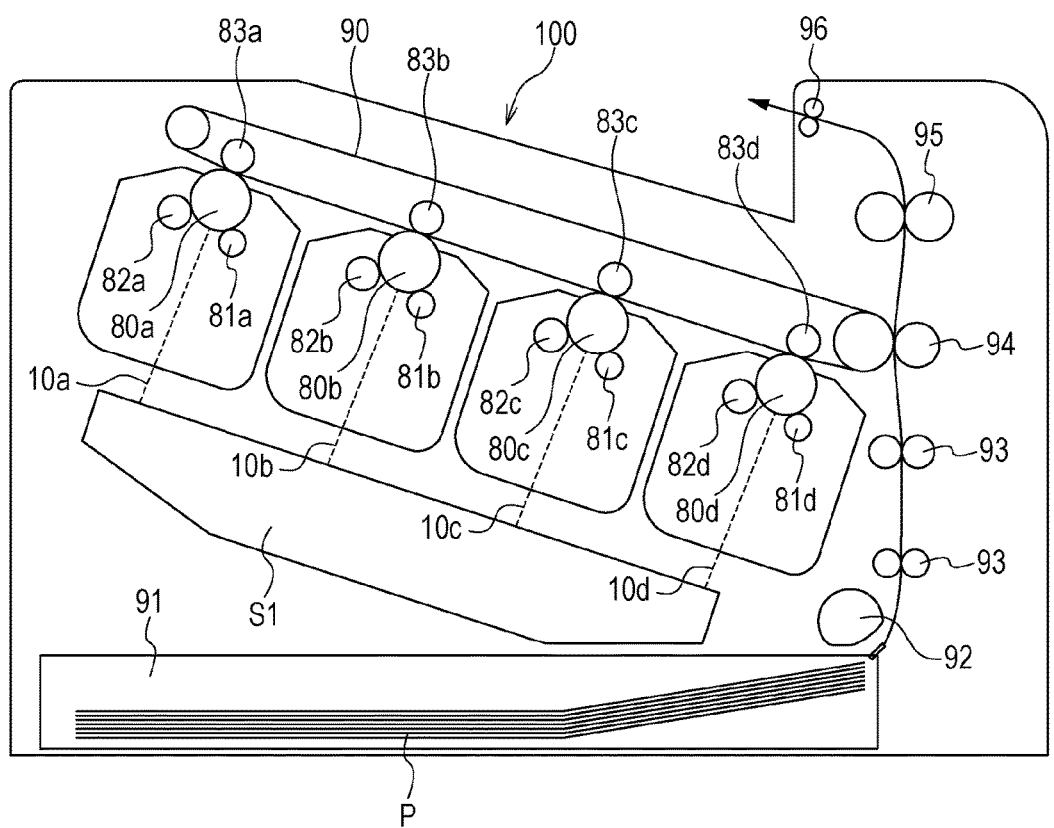
FIG. 16 is a schematic sectional view of an image forming apparatus.

An image forming apparatus 100 according to the present embodiment serves as a color laser beam printer. The overall structure of the image forming apparatus 100 will be described. FIG. 16 is a schematic sectional view of the image forming apparatus 100. The image forming apparatus 100 mainly includes four photoconductor drums 80 (80a, 80b, 80c, and 80d), which are photoconductors, an optical scanning apparatus S1, an intermediate transfer belt 90, a feeding cassette 91, a fixing unit 95, and a second transfer roller 94. Charging rollers 81 (81a, 81b, 81c, and 81d), developing rollers 82 (82a, 82b, 82c, and 82d), and first transfer rollers 83 (83a, 83b, 83c, and 83d) are arranged around the respective photoconductor drums 80 of the image forming apparatus 100 as process units that perform processes on the photoconductor drums 80.

The optical scanning apparatus S1, which serves as an exposure unit, is disposed below the photoconductor drums 80. The optical scanning apparatus S1 performs deflection scanning in which the photoconductor drums 80 are irradiated with the laser beams 10 (10a, 10b, 10c, and 10d). The intermediate transfer belt 90 is stretched around a plurality of rollers, and is arranged above the photoconductor drums 80 so as to be capable of contacting the photoconductor drums 80. First transfer rollers 83a, 83b, 83c, and 83d are arranged inside the intermediate transfer belt 90 so as to oppose the respective photoconductor drums 80. The photoconductor drums 80 and the respective first transfer rollers 83a, 83b, 83c, and 83d sandwich the intermediate transfer belt 90 therebetween, thereby forming first transfer units. The intermediate transfer belt 90 and the second transfer roller 94 contact each other to form the second transfer unit. The feeding cassette 91 is disposed below the optical scanning apparatus S1, and contains sheets (recording media) P. The fixing device 95 is disposed downstream of the second transfer roller 94 in a conveyance direction of the sheets P.

Image Forming Operation

An operation of forming an image on a sheet P is performed by executing the following steps while rotating the photoconductor drums 80. A charging bias voltage is applied to each of charging rollers 81 that are in contact with the surfaces of the respective photoconductor drums 80, so that the surfaces of the photoconductor drums 80 are uniformly charged (charging step). The optical scanning apparatus S1 irradiates the charged photoconductor drums 80 with the laser beams 10 based on image data, so that electrostatic latent images corresponding to the data of images to be formed are formed on the photoconductor drums (exposure step). A developing bias voltage is applied to each of the developing rollers 82, so that toner adheres to the electrostatic latent images formed on the photoconductor drums 80 from the developing rollers 82 (developing step). Through these steps, toner images of different colors, such as Y, M, C, and Bk, are formed on the photoconductor drums 80a, 80b, 80c, and 80d.

A first transfer bias voltage is applied to each of the first transfer rollers 83, so that the toner images on the photoconductor drums 80 are transferred onto the surface of the intermediate transfer belt 90, which moves at substantially the same speed as the speed of the surfaces of the photoconductor drums 80 (first transfer step). In the first transfer step, the toner images on the photoconductor drums 80a, 80b, 80c, and 80d are successively transferred onto the intermediate transfer belt 90 in that order so that the toner images on the photoconductor drums 80 are superimposed on the surface of the intermediate transfer belt 90 so as to form a four-color toner image. The four-color toner image formed in the first transfer step is conveyed to a position of the second transfer roller 94 by the movement of the surface of the intermediate transfer belt 90.

The sheets P contained in the feeding cassette 91 are fed one at a time by a feeding roller 92. The sheet P that has been fed is conveyed by pairs of conveying rollers 93 to the second transfer unit between the intermediate transfer belt 90 and the second transfer roller 94 at the same time as the time when the four-color toner image on the intermediate transfer belt 90 reaches the second transfer unit. A second transfer bias voltage is applied to the second transfer roller 94, so that the four-color toner image on the intermediate transfer belt 90 is transferred onto the sheet P that has been conveyed to the second transfer unit (second transfer step). Subsequently, the sheet P is conveyed to a fixing nip portion of the fixing device 95, and the sheet P is heated and pressed so that the four-color toner image on the sheet P is fixed to the sheet P (fixing step). Then, the sheet P is discharged to the outside of the image forming apparatus 100 by a discharge roller 96. A four-color image is formed on the sheet P by the above-described steps.

Toner that remains on the surface of each photoconductor drum 80 after the first transfer step and toner that remains on the surface of the intermediate transfer belt 90 after the second transfer step are collected by a cleaning unit (not shown) (cleaning step).

Optical Scanning Apparatus S1

Figure 1:
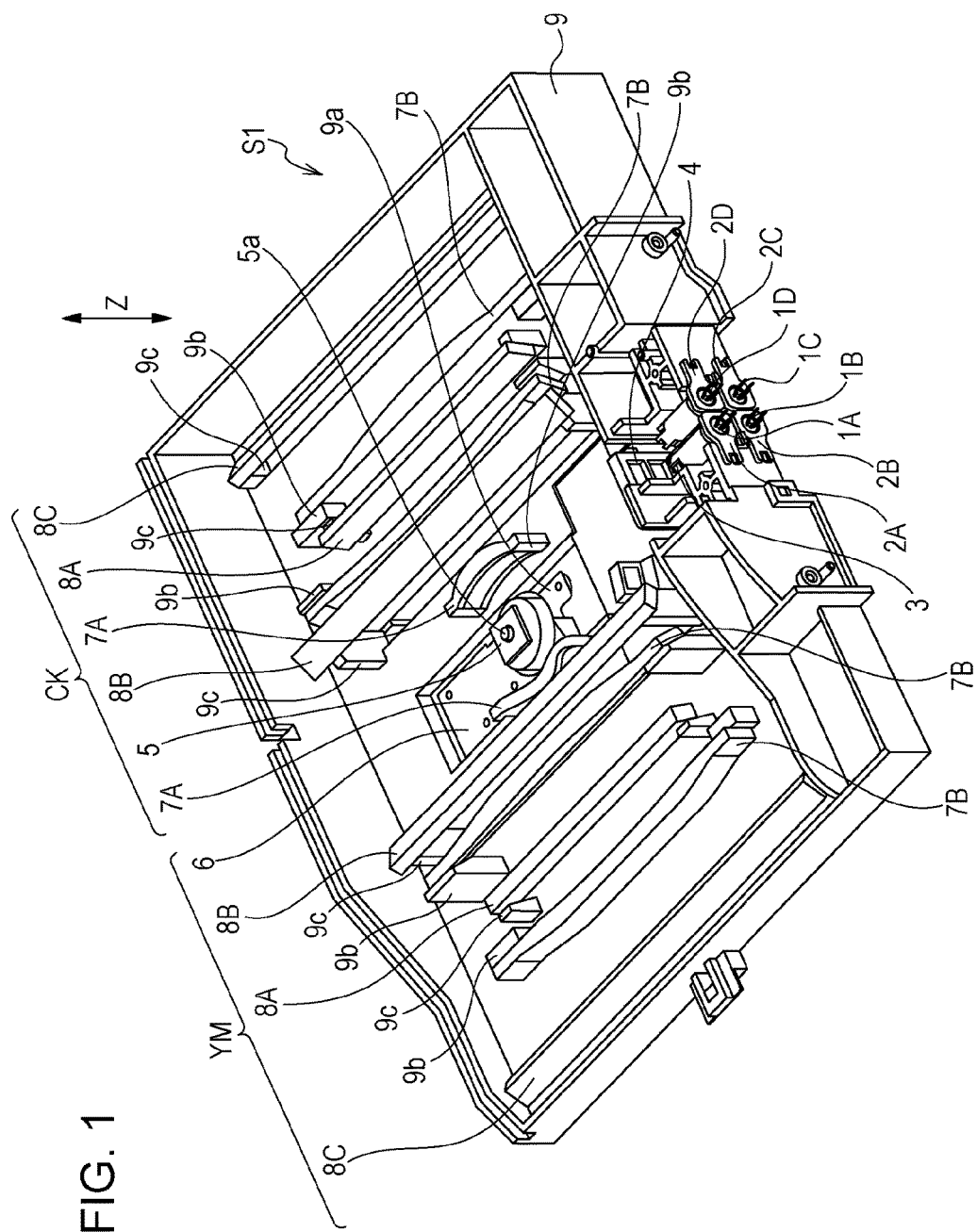
FIG. 1 is a schematic perspective view of an optical scanning apparatus.

The optical scanning apparatus S1 that emits the laser beams 10a to 10d will now be described in detail. FIG. 1 is a schematic perspective view of the optical scanning apparatus S1. For simplicity, FIG. 1 illustrates the state in which a cover member 16, which will be described below, is removed. The optical scanning apparatus S1 includes light sources (laser semiconductors) 1 (1A, 1B, 1C, and 1D), light source holders 2 (2A, 2B, 2C, and 2D) for the respective light sources, collimator lenses 3, cylindrical lenses 4, a rotating polygon mirror 5, and a scanning motor 6. The optical scanning apparatus S1 also includes scanning lenses 7 (7A and 7B) that transmit the light beams 10 reflected by the rotating polygon mirror 5 and folding mirrors 8 (8A, 8B, and 8C) that reflect the laser beams 10 reflected by the rotating polygon mirror 5. The optical scanning apparatus S1 also includes an optical box 9, which is a housing made of a resin that houses the above-described optical members. The cylindrical lenses 4, the scanning motor 6, the scanning lenses 7A and 7B, and the folding mirrors 8A, 8B, and 8C are supported by and fixed to the optical box 9 at predetermined positions on the optical box 9 by a known technology, for example, by being bonded to the optical box 9 with an adhesive, spring-urged by an elastic member, or fastened with a screw. Specifically, as illustrated in FIG. 1, the optical box 9 includes a support portion 9a that positions and supports the rotating polygon mirror 5, support portions 9b that position and support the scanning lenses 7A and 7B, and support portions 9c that position and support the folding mirrors 8A, 8B, and 8C. The cover member 16 (see FIG. 9), which will be described below, is attached to the optical box 9 so as to cover the inner region of the optical box 9.

Laser beams (10A, 10B, 10C, and 10D (see FIGS. 2 and 3) emitted from the semiconductor lasers 1A, 1B, 1C, and 1D, which are light sources, pass through the corresponding collimator lenses 3 and the corresponding cylindrical lenses 4, and are incident on reflecting surfaces of the rotating polygon mirror 5. The rotating polygon mirror 5 is rotated around a rotation shaft 5a by the scanning motor 6, and performs deflection scanning by continuously changing the reflection angles of the laser beams. The laser beams emitted from the semiconductor lasers 1A and 1B are reflected by the same reflecting surface of the rotating polygon mirror toward the left side as seen from the light sources. The laser beams emitted from the semiconductor lasers 1C and 1D are reflected by the same reflecting surface of the rotating polygon mirror toward the right side as seen from the light sources. A first scanning optical system YM, which performs deflection scanning of the laser beams emitted from the semiconductor lasers 1A and 1B, is provided on the left side of the rotation shaft 5a as seen from the light sources. A second scanning optical system CK, which performs deflection scanning of the laser beams emitted from the semiconductor lasers 1C and 1D, is provided on the right side of the rotation shaft 5a as seen from the light sources. Each of the first scanning optical system YM and the second scanning optical system CK includes the scanning lenses 7A and 7B and the folding mirrors 8A, 8B, and 8C.

In the first scanning optical system YM, the laser beam emitted from the semiconductor laser 1A passes through the first fθ lens 7A, is reflected by the folding mirror 8A, and passes through the second fθ lens 7B. Then, the light beam is caused to converge on the corresponding photoconductor (not shown) by the folding mirror 8B, and scans the photoconductor so as to form an electrostatic latent image. The light beam emitted from the semiconductor laser 1B passes through the first fθ lens 7A and the second fθ lens 7B, and is reflected by the folding mirror 8C. The light beam is caused to converge on the corresponding photoconductor, and scans the photoconductor so as to form an electrostatic latent image.

In the second scanning optical system CK, the laser beam emitted from the semiconductor laser 1D passes through the first fθ lens 7A, is reflected by the folding mirror 8A, and passes through the second fθ lens 7B. Then, the light beam is caused to converge on the corresponding photoconductor (not shown) by the folding mirror 8B, and scans the photoconductor so as to form an electrostatic latent image. The light beam emitted from the semiconductor laser 1C passes through the first fθ lens 7A and the second fθ lens 7B, and is reflected by the folding mirror 8C. The light beam is caused to converge on the corresponding photoconductor, and scans the photoconductor so as to form an electrostatic latent image.

Light Source Units 21

Figure 2:
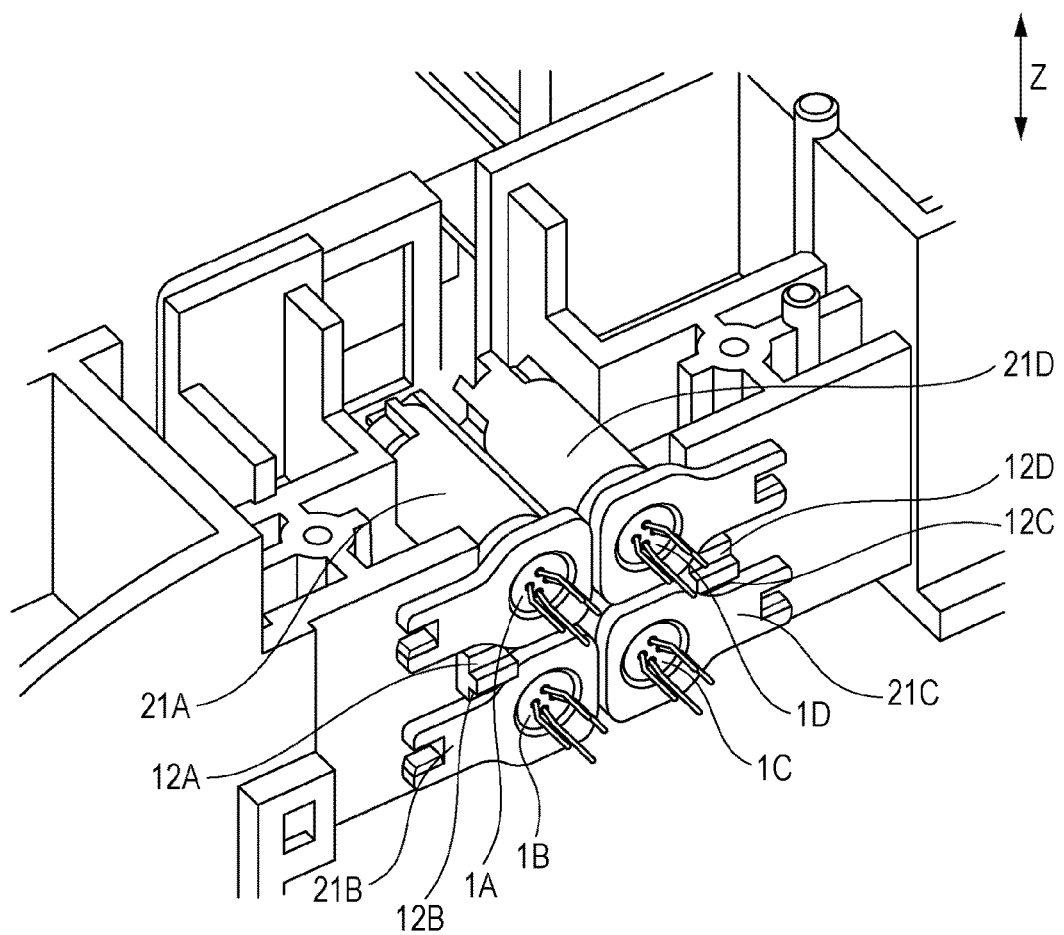
FIG. 2 is a perspective view of a region around light source units in the state in which the light source units are attached to an optical box.
Figure 3:
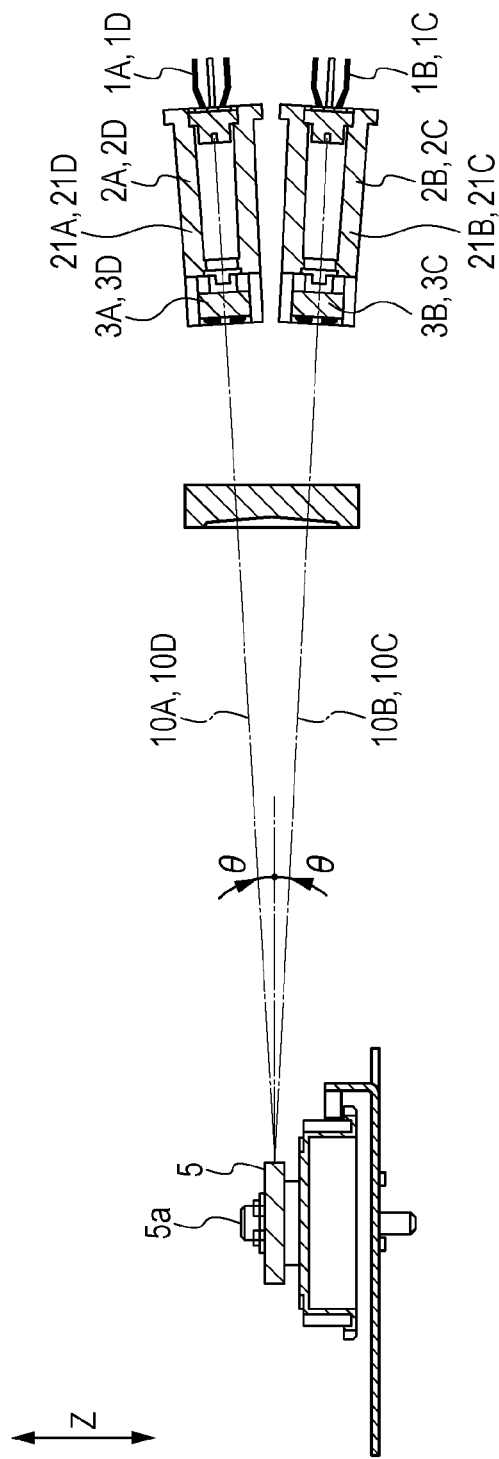
FIG. 3 is a sub-scanning sectional view of light paths from the light source units to a rotating polygon mirror in the state in which the light source units are attached to the optical box.

Light source units will now be described with reference to FIGS. 2 and 3. FIG. 2 is a perspective view of a region around light source units 21 in the state in which the light source units 21 are attached to the optical box 9. FIG. 3 is a sub-scanning sectional view of light paths from the light source units 21 to the rotating polygon mirror 5 in the state in which the light source units 21 are attached to the optical box 9.

In the optical scanning apparatus according to the present embodiment, the laser beams 10 (10A to 10D) emitted from the four semiconductor lasers 1 (1A to 1D), which are light sources, on the basis of the image information are subjected to deflection scanning. The surfaces of the photoconductor drums 80, which serve as scanning surfaces, are irradiated with the respective laser beams 10 (10A to 10D). The surfaces of the photoconductor drums 80 are scanned with the laser beams so that electrostatic latent images are formed thereon. When the direction parallel to the rotation shaft 5a is defined as a rotation axis direction Z, at least in the optical path from each light source 1 to the rotating polygon mirror 5, the direction orthogonal to the optical axis direction and the rotation axis direction Z is defined as a main scanning direction and the direction orthogonal to the optical axis direction and the main scanning direction is defined as a sub-scanning direction.

Referring to FIG. 2, the light source units 21A, 21B, 21C, and 21D are arranged such that the semiconductor lasers 1A and 1C are arranged next to the semiconductor lasers 1B and 1D, respectively, in the rotation axis direction Z so as to form two columns and the semiconductor lasers 1A and 1B are arranged next to the semiconductor lasers 1D and 1C, respectively, in the main scanning direction so as to form two rows. In other words, the light source units 21A and 21D are separated from the light source units 21B and 21C in the rotation axis direction Z.

For convenience, the light source units 21A and 21D are referred to as first light source units, and the light source units 21B and 21C are referred to as second light source units. The light source unit 21C is also referred to as a third light source unit, and the light source unit 21D is also referred to as a fourth light source unit. The first light source unit 21A and the second light source unit 21B are included in the above-described first scanning optical system YM illustrated in FIG. 1. Similarly, the first light source unit 21D and the second light source unit 21C are included in the second scanning optical system CK of the optical scanning apparatus. The first light source unit 21D is located adjacent to the first light source unit 21A in the main scanning direction, and the second light source unit 21C is located adjacent to the second light source unit 21B in the main scanning direction.

As illustrated in FIG. 3, the light source units 21A, 21B, 21C, and 21D respectively include the semiconductor lasers 1A, 1B, 1C, and 1D, the collimator lenses 3A, 3B, 3C, and 3D, and the light source holders 2A, 2B, 2C, and 2D for holding these components. The semiconductor lasers 1 (1A to 1D) are press-fitted to the light source holders 2 (2A to 2D), and the collimator lenses 3 (3A to 3D) are bonded to the light source holders 2 (2A to 2D) by adhesion. The collimator lenses 3 are provided to convert the laser beams 10 incident thereon into substantially parallel light beams.

The light source units 21A, 21B, 21C, and 21D emit the laser beam beams 10A, 10B, 10C, and 10D in a direction of angle θ. The angle θ is an incident angle at which each laser beam is incident on a reflecting surface of the rotating polygon mirror 5, and represents an angle with respect to the direction orthogonal to the reflecting surface (direction orthogonal to the rotation shaft 5a).

Positioning of Light Source Units 21 with Respect to Optical Box 9

Figure 4:
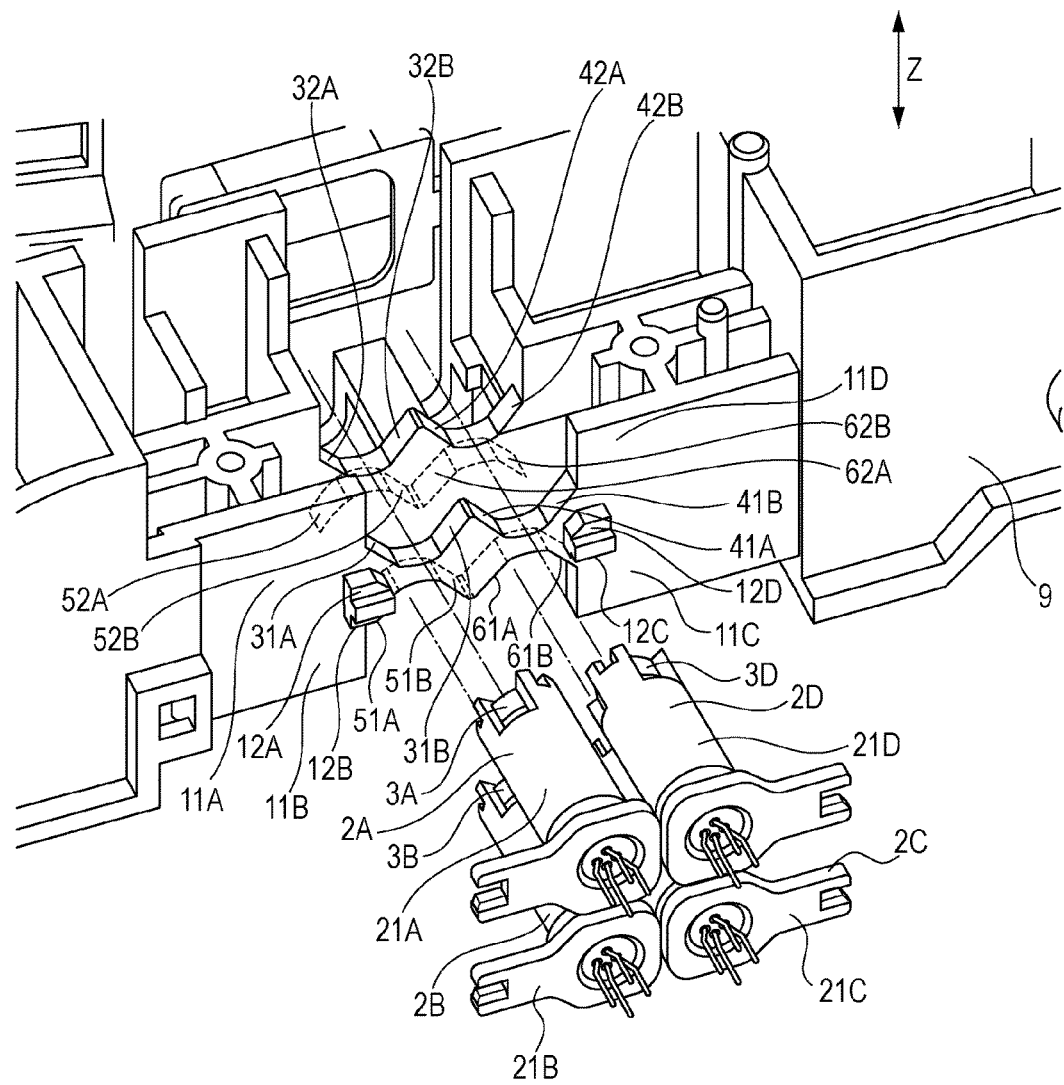
FIG. 4 is a perspective view of the optical box in the state in which the light source units are not attached to the optical box.
Figure 5:
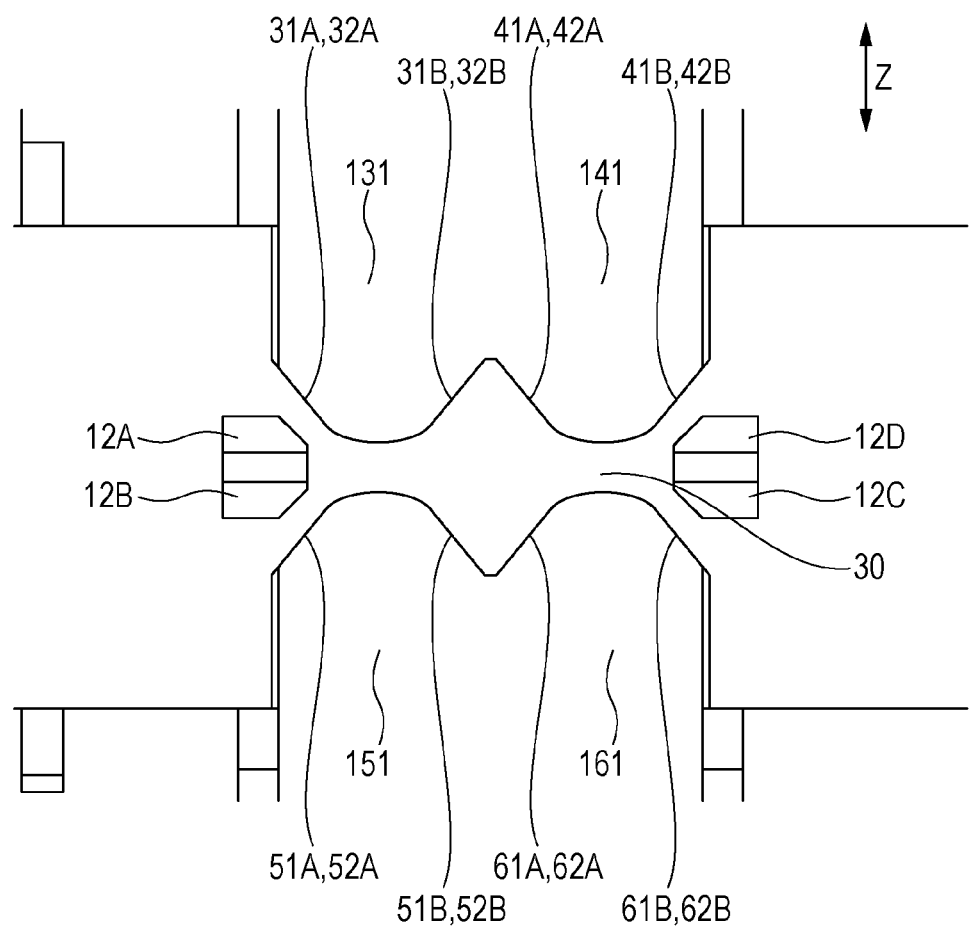
FIG. 5 illustrates a region around a positioning unit for the light source units provided on the optical box, viewed in a direction orthogonal to a main scanning direction and the rotation axis direction.

Positioning of the light source units 21 with respect to the optical box 9 will be described with reference to FIGS. 4 and 5. FIG. 4 is a perspective view of the optical box 9 in the state in which the light source units 21 are not attached to the optical box 9. FIG. 4 illustrates a region around a portion of the optical box 9 to which the light source units 21 are to be attached. FIG. 5 illustrates a region around a positioning unit for the first and second light source units 21 provided on the optical box 9, viewed in the direction orthogonal to the main scanning direction and the rotation axis direction Z. The optical box 9 includes a positioning unit 30 for positioning the light source units 21 with respect to the optical box 9. The positioning unit 30 is a part of the optical box 9, and is molded integrally with the main body of the optical box 9. The positioning unit 30 is located between the light source units 21A and 21B and between the light source units 21C and 21D in the rotation axis direction Z.

The positioning unit 30 includes abutting portions 31A, 31B, 32A, 32B, 41A, 41B, 42A, 42B, 51A, 51B, 52A, 52B, 61A, 61B, 62A, and 62B on which the light source units 21A to 21D abut. All of these abutting portions 31A to 62B are molded integrally with the positioning unit 30 of the optical box 9. The abutting portions 31A to 62B form V-shaped notches when viewed in the optical axis direction, and the size of the openings of the V-shaped notches increases in directions away from the positioning unit 30 along the rotation axis direction Z. The abutting portions 31A, 31B, 32A, 32B, 41A, 41B, 42A, and 42B, which are first abutting portions, and the abutting portions 51A, 51B, 52A, 52B, 61A, 61B, 62A, and 62B, which are second abutting portions, form V-shaped notches that face away from each other in the rotation axis direction Z.

When the light source units 21 are positioned with respect to the abutting portions 31A to 62B of the positioning unit 30, the positions of the light source units 21 with respect to other optical components, such as the cylindrical lenses 4, the rotating polygon mirror 5, the scanning lenses 7, and the folding mirrors 8, are determined. Thus, the optical box 9 functions as a positioning member including a positioning unit for positioning the light source units 21 with respect to the other optical components. In other words, as illustrated in FIG. 1, the optical box 9 includes the support portions 9a, 9b, and 9c for positioning optical components other than the light source units 21, that is, the rotating polygon mirror 5, the scanning lenses 7A and 7B, and the folding mirrors 8A, 8B, and 8C.

The first light source unit 21A is positioned with respect to the optical box 9 in the main scanning direction and the sub-scanning direction by causing the cylindrical light source holder 2A to abut against the abutting portions (first abutting portions) 31A, 31B, 32A, and 32B provided on the positioning unit 30 of the optical box 9. When the distance from the abutting portions 31A and 31B at the semiconductor-laser-1A side of the cylindrical light source holder 2A to the abutting portions 32A and 32B at the collimator-lens-3A side of the cylindrical light source holder 2A is increased, sensitivity to difference in height between the abutting portions 31A and 31B and the abutting portions 32A and 32B can be reduced. As a result, a shift in the angle θ of the laser beams illustrated in FIG. 3 can be reduced.

Similarly, the other first light source unit (third light source unit) 21D is positioned with respect to the optical box 9 in the main scanning direction and the sub-scanning direction by causing the cylindrical light source holder 2D to abut against the abutting portions (third abutting portions that are similar to the first abutting portions) 41A, 41B, 42A, and 42B provided on the positioning unit 30 of the optical box 9. When the distance from the abutting portions 41A and 41B at the semiconductor-laser-1D side of the cylindrical light source holder 2D to the abutting portions 42A and 42B at the collimator-lens-3D side of the cylindrical light source holder 2D is increased, sensitivity to difference in height between the abutting portions 41A and 41B and the abutting portions 42A and 42B can be reduced. As a result, a shift in the angle θ of the laser beams illustrated in FIG. 3 can be reduced.

The second light source unit 21B is positioned with respect to the optical box 9 in the main scanning direction and the sub-scanning direction by causing the cylindrical light source holder 2B against the abutting portions (second abutting portions) 51A, 51B, 52A, and 52B provided on the positioning unit 30 of the optical box 9. When the distance from the abutting portions 51A and 51B at the semiconductor-laser-1B side of the cylindrical light source holder 2B to the abutting portions 52A and 52B at the collimator-lens-3B side of the cylindrical light source holder 2B is increased, sensitivity to difference in height between the abutting portions 51A and 51B and the abutting portions 52A and 52B can be reduced. As a result, a shift in the angle θ of the laser beams illustrated in FIG. 3 can be reduced.

Similarly, the other second light source unit (fourth light source unit) 21C is positioned with respect to the optical box 9 in the main scanning direction and the sub-scanning direction by causing the cylindrical light source holder 2C to abut against the abutting portions (fourth abutting portions that are similar to the second abutting portions) 61A, 61B, 62A, and 62B provided on the positioning unit 30 of the optical box 9. When the distance from the abutting portions 61A and 61B at the semiconductor-laser-1C side of the cylindrical light source holder 2C to the abutting portions 62A and 62B at the collimator-lens-3C side of the cylindrical light source holder 2C is increased, sensitivity to difference in height between the abutting portions 61A and 61B and the abutting portions 62A and 62B can be reduced. As a result, a shift in the angle θ of the laser beams illustrated in FIG. 3 can be reduced.

Thus, the first light source units 21A and 21D and the second light source units 21B and 21C abut on the abutting portions 31A, 31B, 32A, and 32B, the abutting portion 41A, 41B, 42A, and 42B, the abutting portions 51A, 51B, 52A, and 52B, and the abutting portions 61A, 61B, 62A, and 62B of the positioning unit 30 from the both sides of the positioning unit 30 in the rotation axis direction Z.

The first light source unit 21A and the second light source unit 21B abut on the abutting portions 31A, 31B, 32A, and 32B and the abutting portions 51A, 51B, 52A, and 52B, respectively, in directions that are parallel to the rotation axis direction Z and are toward each other. The first light source unit 21D and the second light source unit 21C abut on the abutting portions 41A, 41B, 42A, and 42B and the abutting portions 61A, 61B, 62A, and 62B, respectively, in directions that are parallel to the rotation axis direction Z and are toward each other.

In other words, the positioning unit 30 is provided between the light source units 21A and 21D and the light source units 21B and 21C in the rotation axis direction Z, and the abutting portions 31A to 62B on which the light source units 21A to 21D abut are formed integrally with the positioning unit 30 at both sides of the positioning unit 30 in the rotation axis direction (Z direction). Thus, the light source units 21A to 21D can be positioned in the rotation axis direction Z by forming a single positioning unit 30. Therefore, compared to the structure of the related art which requires two positioning units to be provided outside the light source units in the rotation axis direction Z, the size of the optical box 9 can be reduced.

The abutting portions 31A and 31B are formed integrally with the optical box 9, and can form a V-shaped notch of about 60° to 80° when viewed in the optical axis direction so that the center axis of the light source unit 21A can be readily positioned at the center.

Similarly, the abutting portions 32A and 32B, the abutting portions 41A and 41B, the abutting portions 42A and 42B, the abutting portions 51A and 51B, the abutting portions 52A and 52B, the abutting portions 61A and 61B, and the abutting portions 62A and 62B are formed integrally with the optical box 9, and can form V-shaped notches of about 60° to 80° when viewed in the optical axis direction so that the center axes of the light source units 21D, 21B, and 21C can be readily positioned at the respective centers.

The optical box 9 includes the positioning unit located between the first and second light source units in the rotation axis direction Z. The abutting portions 31A, 31B, 32A, 32B, 51A, 51B, 52A, and 52B and the abutting portions 41A, 41B, 42A, 42B, 61A, 61B, 62A, and 62B are formed integrally with the positioning unit.

The first and second light source units 21A, 21D, 21B, and 21C are pressed against the corresponding abutting portions 31A to 62B of the optical box 9 by urging members, which will be described below, and are secured in a state such that the first and second light source units 21A, 21D, 21B, and 21C are positioned with respect to the optical box 9. The light source units 21A, 21D, 21B, and 21C are positioned with respect to the optical box 9 in the optical axis direction by causing the light source holders 2A, 2D, 2B, and 2C to abut on abutting portions 11A, 11D, 11B, and 11C, respectively, which are provided on the optical box 9, in the optical axis direction. Each of the semiconductor lasers 1A, 1B, 1C, and 1D is a multilaser including a plurality of light sources (light emitting points) capable of emitting light independently. The light source units 21 (21A to 21D) are rotated around the optical axes to adjust the rotational positions (phases) thereof to desired positions. Then, the light source holders 2 (2A to 2D) are fixed to bonding portions 12 (12A to 12D), which are provided on the optical box 9, with an ultraviolet curable adhesive.

Method for Molding Positioning Unit

A method for molding the abutting portions 31A to 62B, which are positioning portions, of the first and second light source units 21 will now be described. First, a molding method of the structure according to the related art illustrated in FIG. 14 will be described.

Figure 14:
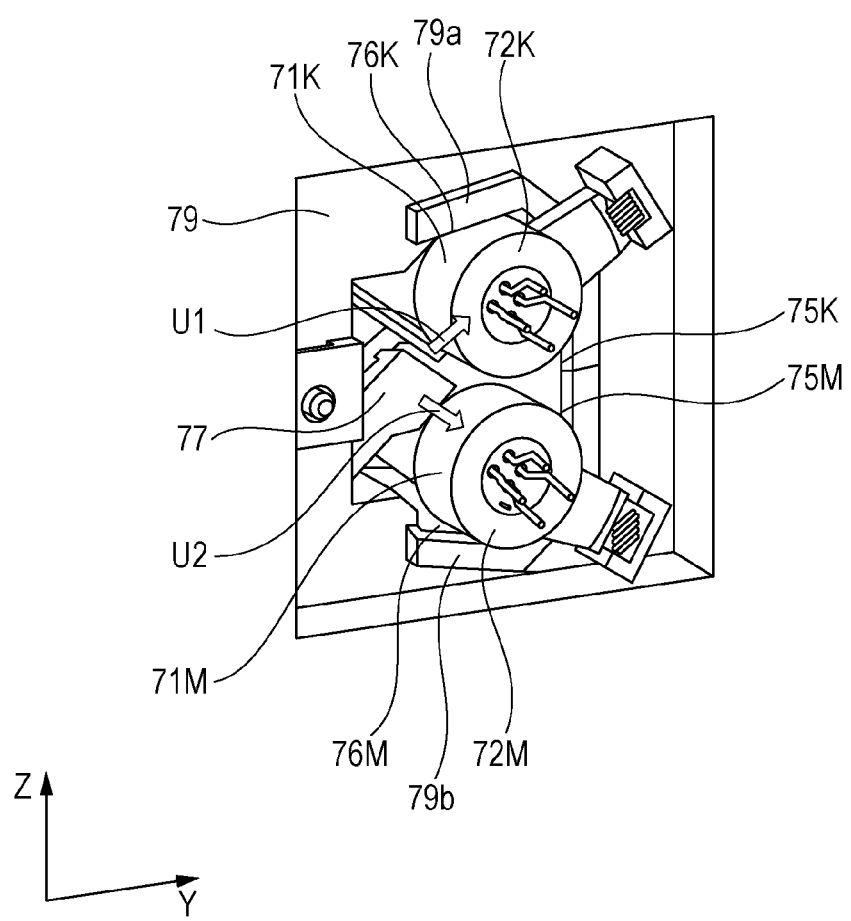
FIG. 14 is a perspective view of a part of an optical scanning apparatus according to the related art.

In the structure of the related art illustrated in FIG. 14, the abutting portions 75K, 75M, 76K, and 76M for the light source units 71K and 71M are formed on the edge of the opening formed in the side surface of the optical box 79. Therefore, a mold having a complex shape is needed to mold the optical box 79 by using a resin, and nonuniform temperature in the mold causes nonuniform shrinking of the resin. Thus, there is a risk that the stability of the molding process and the molding precision of the abutting portions 75K to 76M will be reduced.

Figure 15:
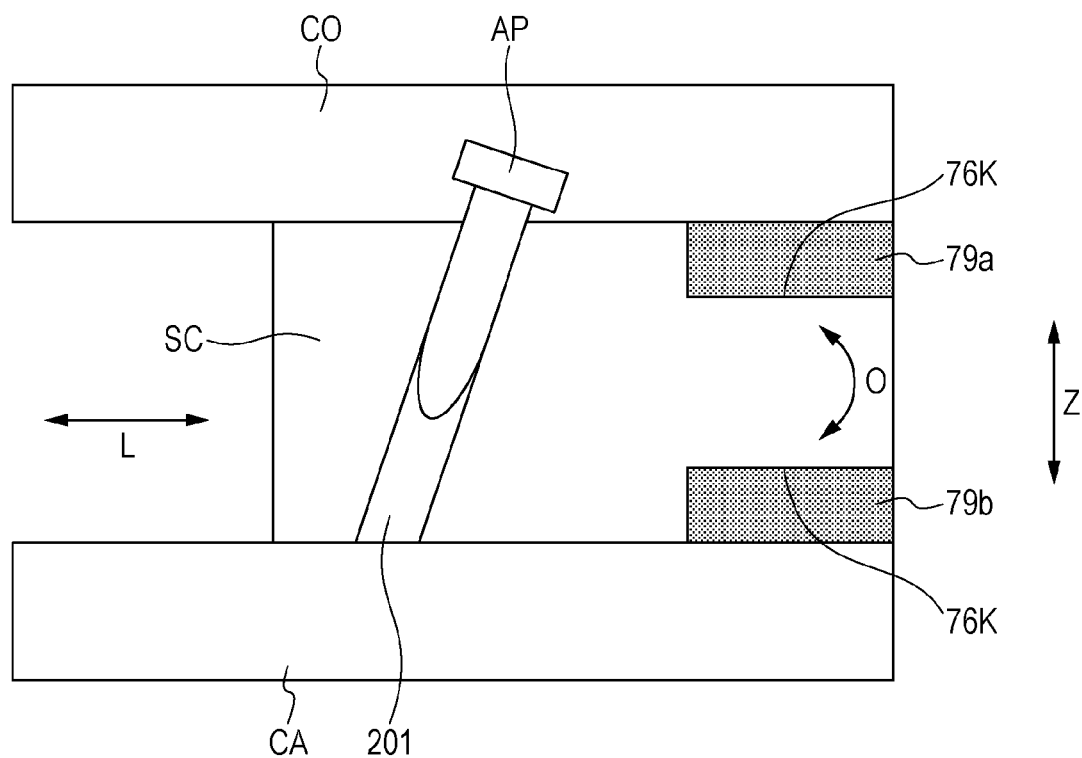
FIG. 15 is a sub-scanning sectional view illustrating a process of molding an optical box according to the related art with a mold.

This will be further described with reference to FIG. 15. FIG. 15 is a sub-scanning sectional view illustrating a process of molding an optical box according to the related art with a mold. In general, an optical box is formed by using two molds, which are a fixed (cavity side) mold CA and a movable (core side) mold CO that can be opened and closed in the rotation axis direction Z. Since the optical box 79 includes the abutting portions 75L to 76M, a sliding mold (slide core) SC is needed in addition to the fixed mold CA and the movable mold CO. The slide core SC has a hole 201 the receives an angular pin AP, and is movable in the L direction by using an opening-closing movement of the cavity-side mold CA and the core-side mold CO in the rotation axis direction Z. The slide core SC is guided by a guide rail (not shown) that extends in the L direction, and is regulated such that the slide core SC moves in the L direction. Since the slide core SC is configured to move while being regulated by the guide rail, a clearance (gap) of several to several tens of millimeters is formed between the slide core SC and the guide rail. Therefore, there is a possibility that the orientation of the slide core SC will be unstable and, for example, the slide core SC will be somewhat tilted in the direction of arrow O from the regular position thereof. In addition, since the abutting portions 75K to 76M are formed by sliding the slide core SC, there is a risk that marks, such as slide marks, will be formed on the abutting portions 75K to 76M which have precision surfaces that serve as positioning surfaces of the optical box 79.

As described above, the abutting portions 75K to 76M are formed not by the fixed mold CA and the movable mold CO, which can be opened and closed in the rotation axis direction Z, but by the slide core SC. Therefore, there is a risk that the molding precision of the abutting portions 75K to 76M will be reduced for the above-described reason. As a result, the attachment precision of the light source units 71K and 71M in the optical scanning apparatus may be reduced and the spot shape of the latent image formed on the scanned surface may be degraded. Thus, there is a risk that the desired scanning process cannot be performed and the quality of the image formed by the image forming apparatus will be reduced.

Next, a method for molding the optical box 9 according to the present embodiment will be described. Similar to the structure of the related art illustrated in FIG. 15, the main body of the optical box 9 is formed by closing a cavity mold CA and a core mold CO, which can be opened and closed in the rotation axis direction Z, injecting a resin that serves as a flowable mold material into the space between the cavity mold CA and the core mold CO, and curing the mold material. The mold material that has been cured is removed from the cavity mold CA and the core mold CO by opening the cavity mold CA and the core mold CO. Thus, the molded product is completed. In the present embodiment, the abutting portions 31A to 62B of the positioning unit for the first and second light source units 21 are also configured such that they can be molded only by the cavity mold CA and the core mold CO without using the slide core SC. This will be described in more detail.

Figure 6:
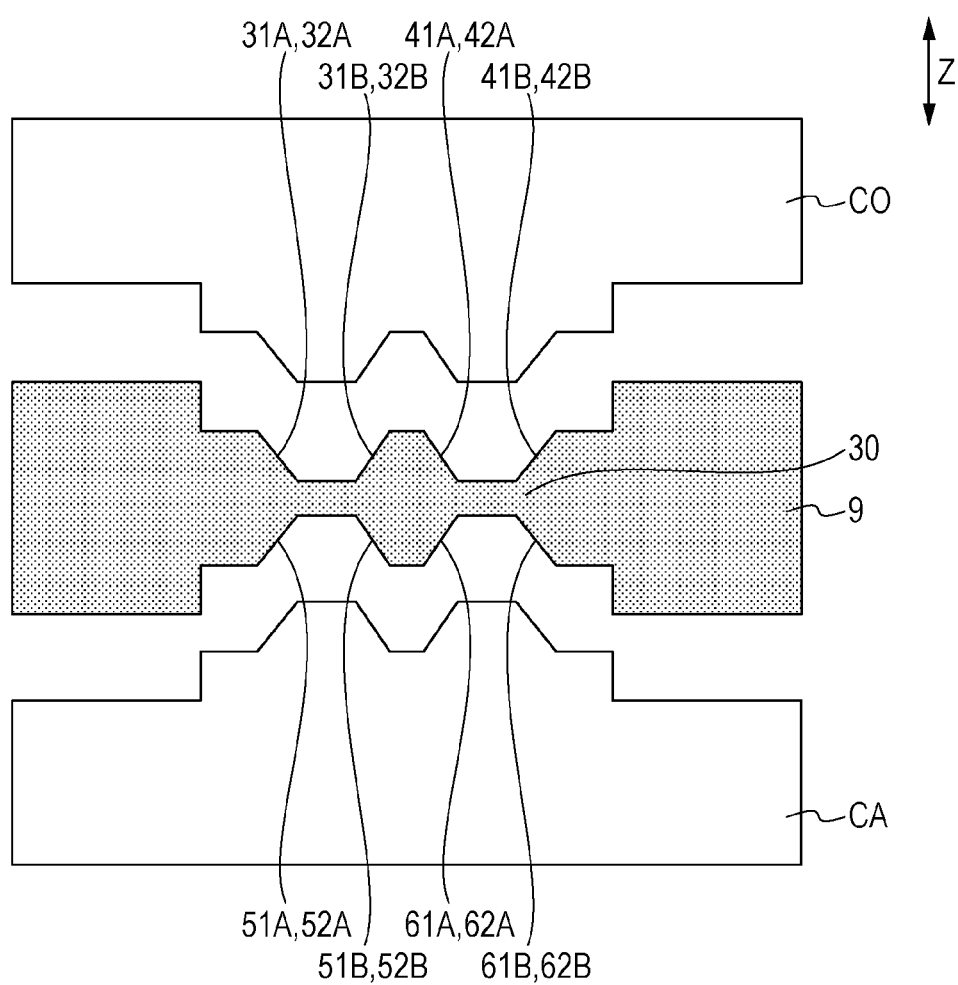
FIG. 6 illustrates the region around the positioning unit for the light source units provided on the optical box in a process of manufacturing the optical box, viewed in the direction orthogonal to the main scanning direction and the rotation axis direction.

As described above, FIG. 5 illustrates a region around the positioning unit for the first and second light source units 21 provided on the optical box 9, viewed in the direction orthogonal to the main scanning direction and the rotation axis direction Z. FIG. 6 illustrates the region around the positioning unit for the first and second light source units 21 provided on the optical box 9 in a process of manufacturing the optical box 9, viewed in the direction orthogonal to the main scanning direction and the rotation axis direction Z.

In the present embodiment, the optical box 9 has openings 131, 141, 151, and 161. Specifically, the opening 131, in which there is no portion that is formed integrally with the optical box 9, is provided so as to oppose the positioning unit 30 with the light source unit 21A (see FIG. 2) provided therebetween. Similarly, the opening 151, in which there is no portion that is formed integrally with the optical box 9, is provided so as to oppose the positioning unit 30 with the light source unit 21B (see FIG. 4) provided therebetween. Similarly, the opening 161, in which there is no portion that is formed integrally with the optical box 9, is provided so as to oppose the positioning unit 30 with the light source unit 21C provided therebetween. Similarly, the opening 141, in which there is no portion that is formed integrally with the optical box 9, is provided so as to oppose the positioning unit 30 with the light source unit 21D provided therebetween. Since the openings 131 to 161 are formed in the optical box 9, as illustrated in FIG. 6, the abutting portions 31A to 62B can be formed without using the slide core SC by injecting a resin that serves as a flowable mold material into the space between the cavity mold CA and the core mold CO, which can be opened and closed in the rotation axis direction Z (which can be moved toward and away from each other in the rotation axis direction Z), and curing the mold material. As illustrated in FIG. 6, portions corresponding to the abutting portions 31A, 31B, 32A, 32B, 41A, 41B, 42A, and 42B and the support portions 9a, 9b, and 9c (see FIG. 1) are formed by the core mold CO. Portions corresponding to the abutting portions 51A, 51B, 52A, 52B, 61A, 61B, 62A, and 62B are formed by the cavity mold CA. Therefore, compared to the structure of the related art (structure in which the slide core SC is used), the molding precision of the abutting portions 31A to 62B can be increased. In addition, the structure of the mold used to form the optical box 9 can be simplified.

Fixation of Light Source Units 21

Figure 7:
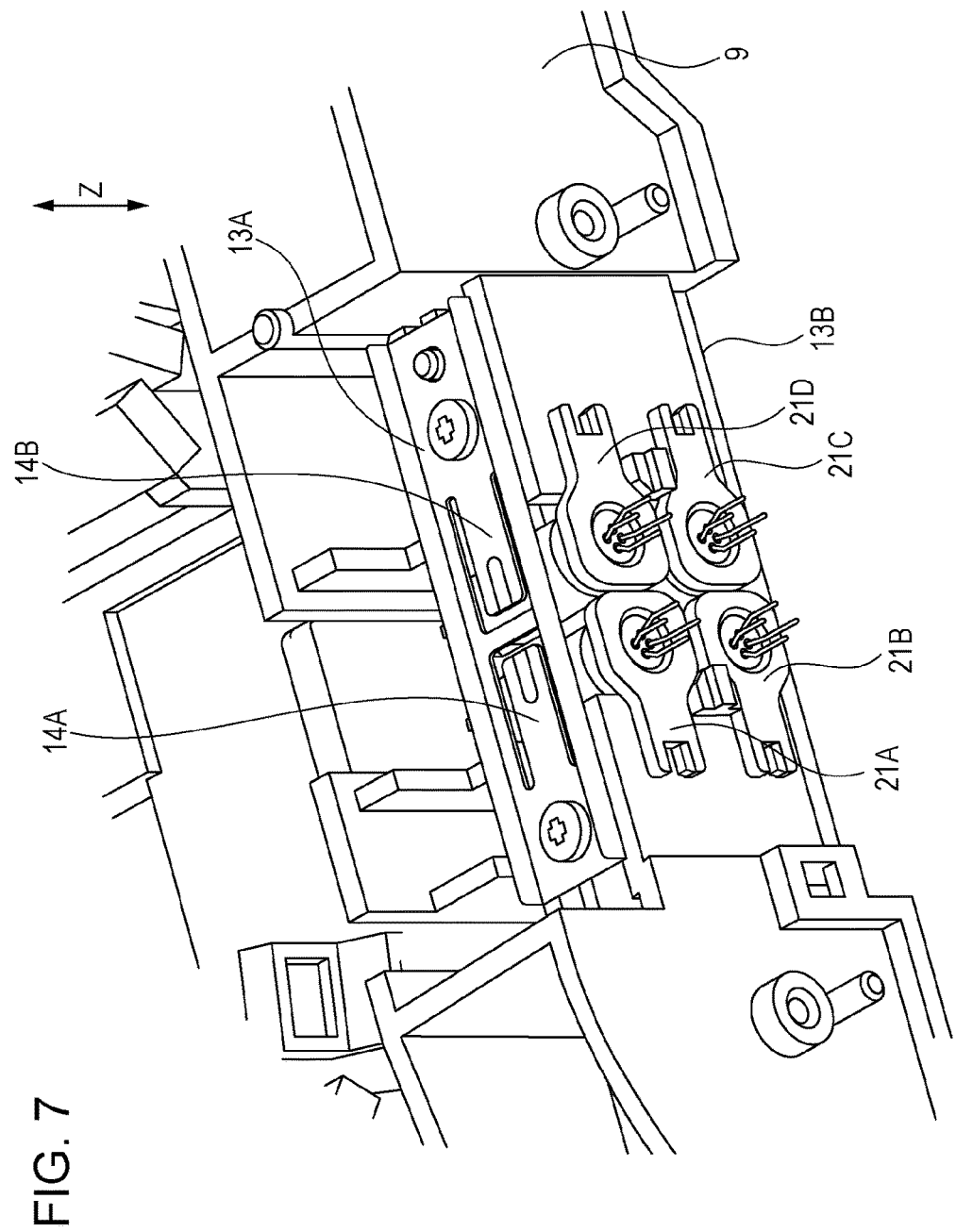
FIG. 7 is a perspective view of the optical scanning apparatus.

Next, a method for fixing the light source units 21 will be described with reference to FIG. 7. FIG. 7 is a perspective view of the optical scanning apparatus S1. The optical scanning apparatus S1 includes a reinforcing member 13A and a reinforcing member 13B, which are fastened with screws to the optical box 9 at both sides of the first openings 131 and 141 and both sides of the second openings 151 and 161 in the main scanning direction. The reinforcing members 13A and 13B have the same shape.

The reinforcing members 13A and 13B are leaf springs, and serve as pressing members including pressing portions 14A and 14B for pressing the light source units 21. The reinforcing member 13A presses the light source holder 2A against the abutting portions 31A, 31B, 32A, and 32B and the light source holder 2D against the abutting portions 41A, 41B, 42A, and 42B in the rotation axis direction Z with the pressing portions 14A and 14B. Similarly, the reinforcing member 13B presses the light source holder 2B against the abutting portions 51A, 51B, 52A, and 52B and the light source holder 2C against the abutting portions 61A, 61B, 62A, and 62B. Thus, the state in which the light source units 21A, 21B, 21C, and 21D are positioned with respect to the optical box 9 and secured is maintained. Since the light source unit 21A and the light source unit 21B are pressed in opposite directions, the stress applied by the light source unit 21A to the positioning unit 30 at the abutting portion 31A to 32B and that applied by the light source unit 21B to the positioning unit 30 at the abutting portions 51A to 52B cancel each other. Therefore, the positioning unit 30 is not easily deformed by the pressing forces applied by the reinforcing members 13A and 13B, and the rigidity of the positioning unit 30 can be made lower than that in the structure of the related art. The relationship between the abutting portions 41A to 42B and the abutting portions 61A to 62B is similar to the above-described relationship.

Figure 8A:
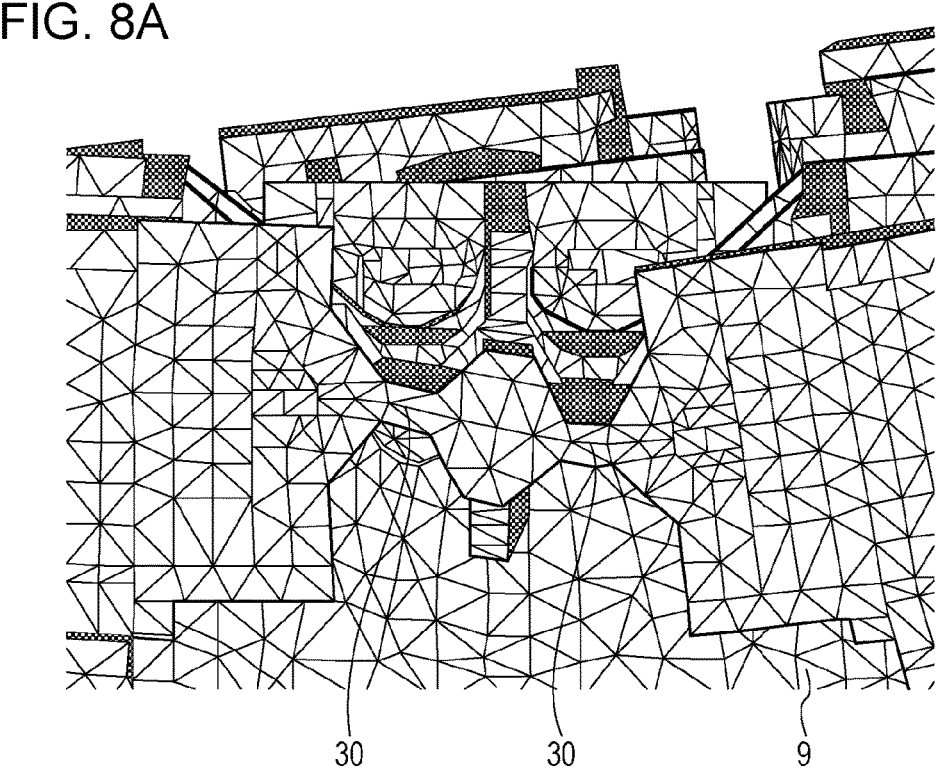
FIG. 8A illustrates the result of simulation of deformation of the optical box when an external force is applied to the optical box in the case where no reinforcing member is provided.
Figure 8B:
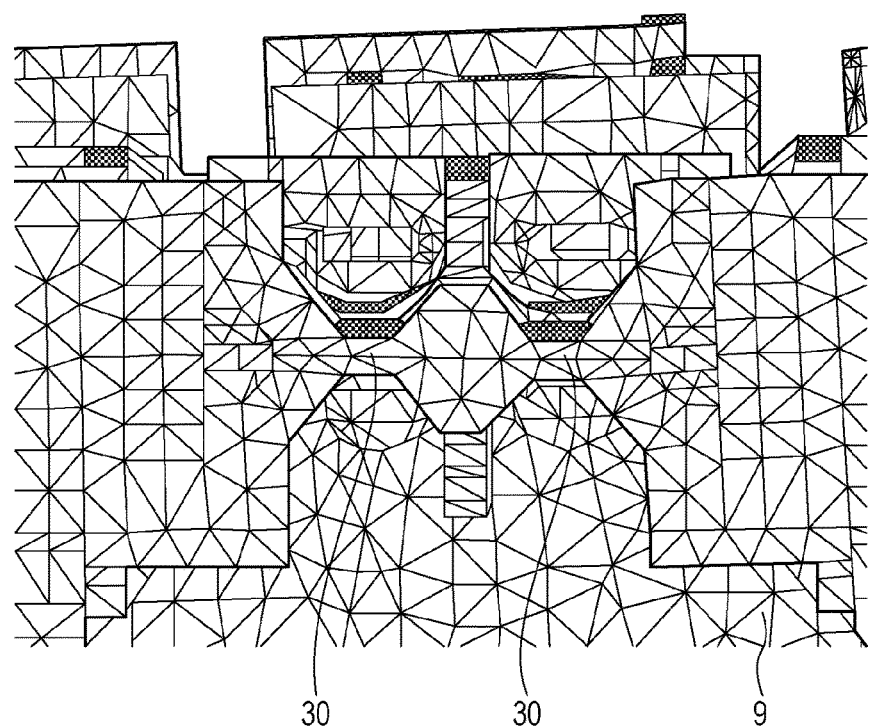
FIG. 8B illustrates the result of simulation of deformation of the optical box when an external force is applied to the optical box in the case where a reinforcing member is provided.

Next, a difference in deformation of the positioning unit 30 depending on the presence or absence of the reinforcing members 13 will be described. FIGS. 8A and 8B illustrate the results of simulation of deformation of the optical box 9 in the case where an external force is applied to the optical box 9. In FIGS. 8A and 8B, degrees of deformation are exaggerated. FIG. 8A illustrates the case in which no reinforcing member is provided, and FIG. 8B illustrates the case in which the reinforcing members 13 are provided. For simplicity, the reinforcing members 13 are not illustrated in FIGS. 8A and 8B. As is clear from FIG. 8A, when the reinforcing members 13 are not provided, the rigidity of the optical box 9 is low in the region around the positioning unit 30, and the positioning unit 30 is easily deformed by a large amount. In contrast, as is clear from FIG. 8B, when the reinforcing members 13 are provided, the rigidity of the optical box 9 is high in the region around the positioning unit 30, and the amount of deformation of the positioning unit 30 is small. The above-described effect can, of course, be achieve when at least one of the reinforcing members 13A and 13B is provided.

Figure 9:
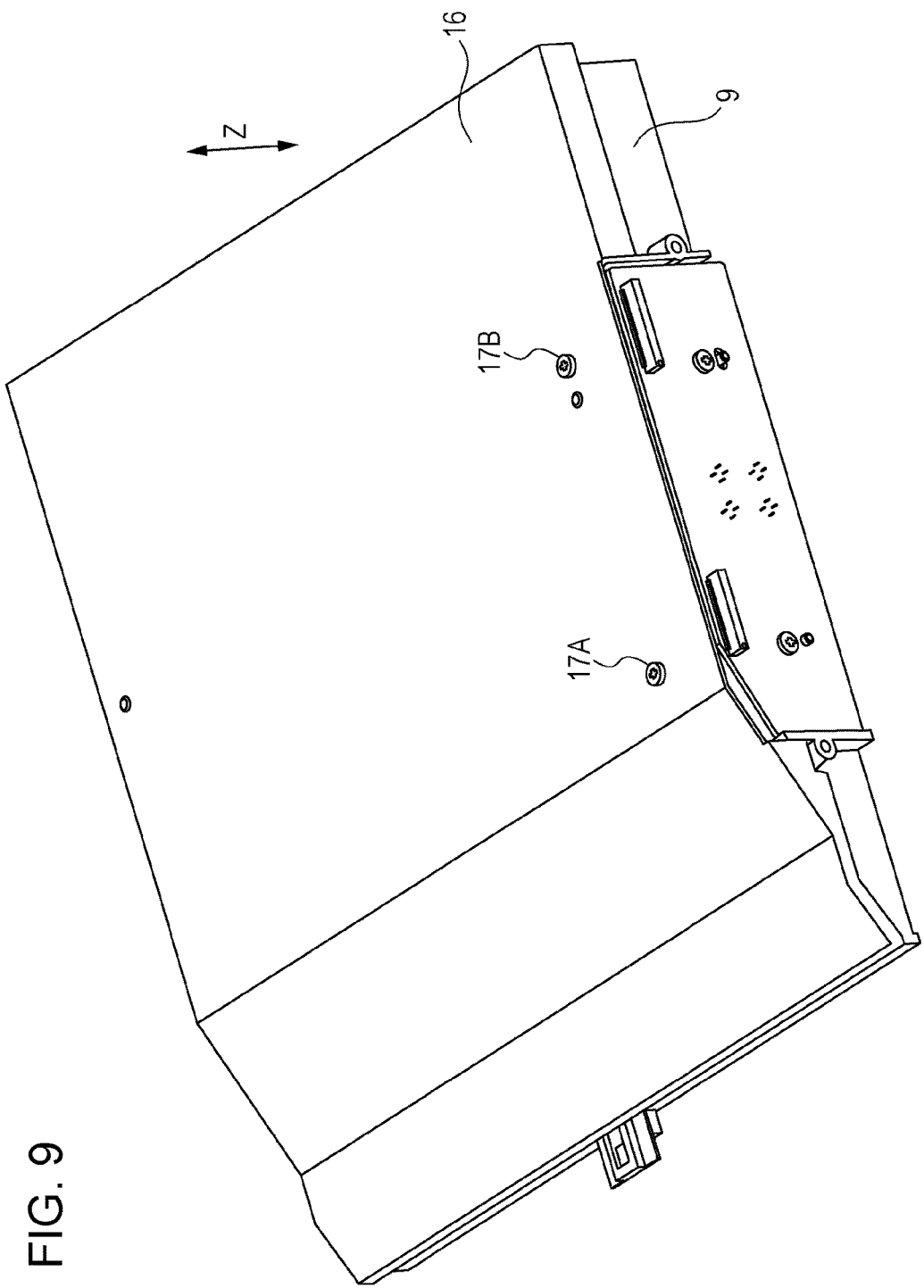
FIG. 9 is a perspective view of the optical box to which a cover member is attached.

As described above, the reinforcing members 13A and 13B are fastened with screws to the optical box 9 at both sides of the first openings 131 and 141 and the second openings 151 and 161 in the main scanning direction. Since the reinforcing members 13A and 13B function as beams for reducing deformation of the optical box 9, deformation of the positioning unit 30 can be reduced. The reinforcing member 13A covers the first openings 131 and 141, and the reinforcing member 13B covers the second openings 151 and 161. The reinforcing members 13A and 13B include the pressing portions 14A and 14B that press the light source units 21 against the abutting portions 31A to 62B. Therefore, it is not necessary to form urging members including pressing portions in addition to the reinforcing members, so that reduction in size and cost can be achieved. In the present embodiment, the cover member 16 that covers the inside of the optical box 9 also functions as a reinforcing member. This will be described with reference to FIG. 9. FIG. 9 is a perspective view of the optical box 9 to which the cover member 16 is attached. The cover member 16 is fixed to the optical box 9 with screws 17A and 17B at least at both sides of the first openings 131 and 141 and the second openings 151 and 161 in the main scanning direction, and provides an effect similar to that of the above-described reinforcing members 13.

Figure 10:
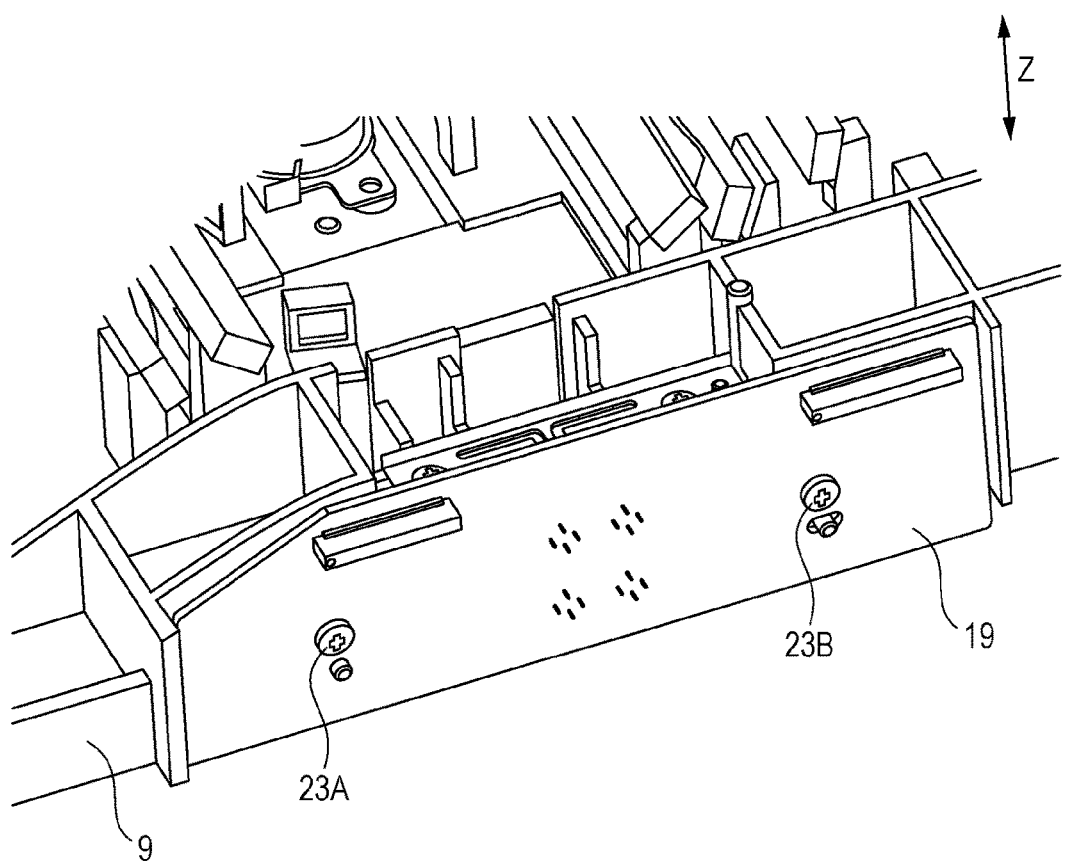
FIG. 10 is a perspective view of a region around a portion of the optical box to which a laser drive substrate is attached.

In addition, in the present embodiment, a laser drive substrate 19, which includes a circuit for driving the light sources 1 (1A to 1D), also functions as a reinforcing member. This will be described with reference to FIG. 10. FIG. 10 is a perspective view of a region around a portion of the optical box 9 to which the laser drive substrate 19 is attached. The laser drive substrate 19 is fixed to the optical box 9 with screws 23A and 23B at least at both sides of the first openings 131 and 141 and the second openings 151 and 161 in the main scanning direction, and provides an effect similar to that of the above-described reinforcing members 13.

Figure 11:
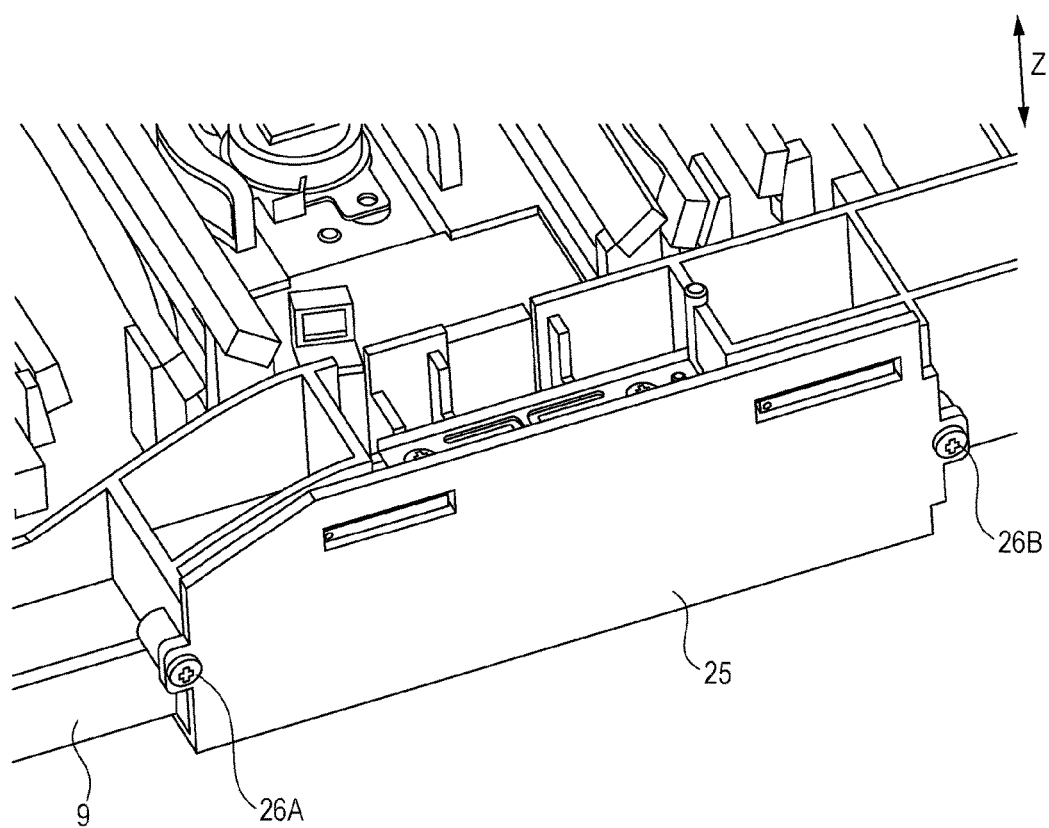
FIG. 11 is a perspective view of the region around the portion of the optical box to which the laser drive substrate is attached.
Figure 12:
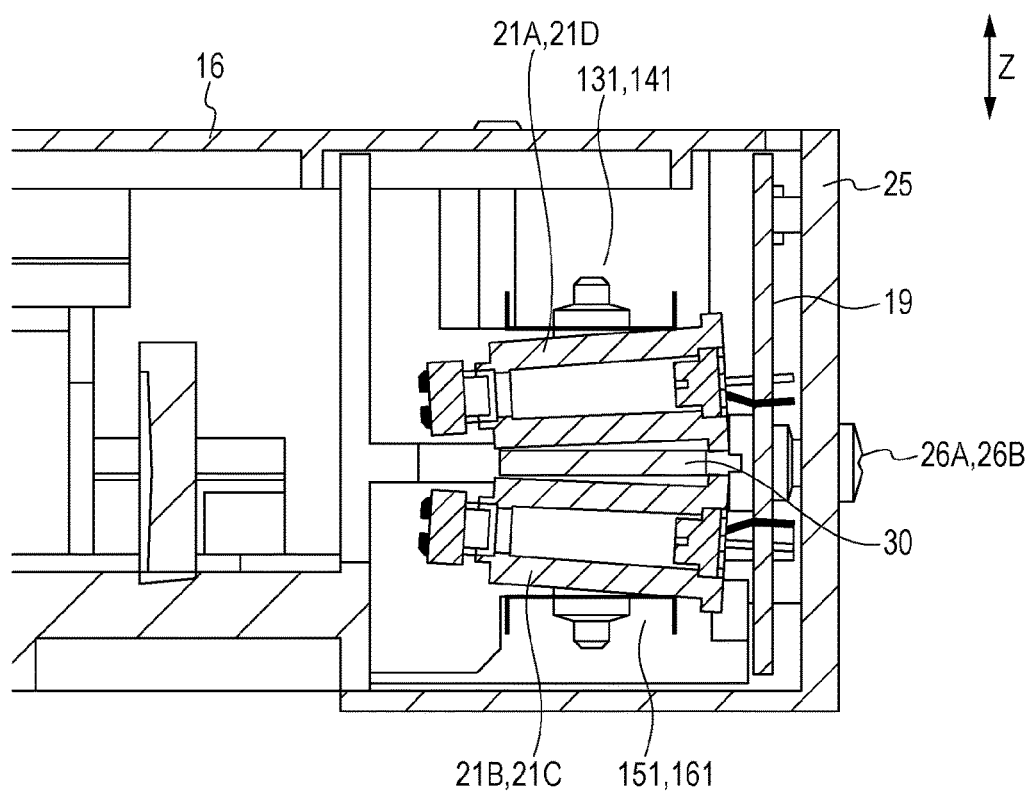
FIG. 12 is a sub-scanning sectional view of the region around the portion of the optical box to which the laser drive substrate is attached.

In addition, in the present embodiment, a substrate cover member 25, which covers the laser drive substrate 19, also functions as a reinforcing member. This will be described with reference to FIGS. 11 and 12. FIG. 11 is a perspective view of the region around the portion of the optical box 9 to which the laser drive substrate 19 is attached. The substrate cover member 25 is fixed to the optical box 9 with screws 26A and 26B at least at both sides of the first openings 131 and 141 and the second openings 151 and 161 in the main scanning direction, and provides an effect similar to that of the above-described reinforcing members 13. The substrate cover member 25 also has an additional function. FIG. 12 is a sub-scanning sectional view of the region around the portion of the optical box 9 to which the laser drive substrate 19 is attached. The substrate cover member 25 is L-shaped in cross section and includes a portion that covers the laser drive substrate 19 and a portion that covers the openings 151 and 161 adjacent to the light source units 21B and 21C. Since the openings 151 and 161 adjacent to the light source units 21B and 21C are covered by the substrate cover member 25, foreign substance, such as dust, can be prevented from flowing into the optical box 9. The openings 131 and 141 adjacent to the light source units 21A and 21D are also covered by the cover member 16 to prevent foreign substance, such as dust, from flowing into the optical box 9.

As described above, in the present embodiment, the positioning unit 30 is provided between the light source units 21A and 21D and the light source units 21B and 21C in the rotation axis direction Z. The abutting portions 31A to 62B, on which the light source units 21A to 21D abut, are formed integrally with the positioning unit 30. In other words, the abutting portions 31A to 62B are provided on both sides of a single positioning unit 30 in the rotation axis direction (Z direction). In contrast, in the structure of the related art, the two positioning units corresponding to the respective light source units are disposed outside the two light source units in the rotation axis direction. Therefore, when the positioning unit is configured as in the present embodiment, the sizes of the positioning unit, the optical box including the positioning unit, the optical scanning apparatus, and the image forming apparatus including the optical scanning apparatus can be reduced in the rotation axis direction Z.

In addition, in the present embodiment, since the light source units 21A and 21D are pressed in a direction opposite to the direction in which the light source units 21B and 21C are pressed, the stresses applied by the light source units 21 to the positioning unit 30 at the abutting portions 31A to 62B cancel each other. Therefore, the positioning unit 30 is not easily deformed by the pressing forces applied by the reinforcing members 13A and 13B, and the rigidity of the positioning unit 30 can be made lower than that in the structure of the related art.

In addition, according to the present embodiment, the abutting portions on which the first and second light source units abut so as to oppose each other in the rotation axis direction Z are formed on the optical box 9, and openings are formed so as to oppose the abutting portions in the rotation axis direction Z. Therefore, the abutting portions can be formed without using a slide core. As a result, the molding precision of the abutting portions can be increased. In addition, the structure of the mold used to form the optical box 9 can be simplified.

Second Embodiment

A second embodiment will now be described. Components similar to those in the first embodiment are denoted by the same reference numerals, and explanations thereof are thus omitted.

Figure 13A:
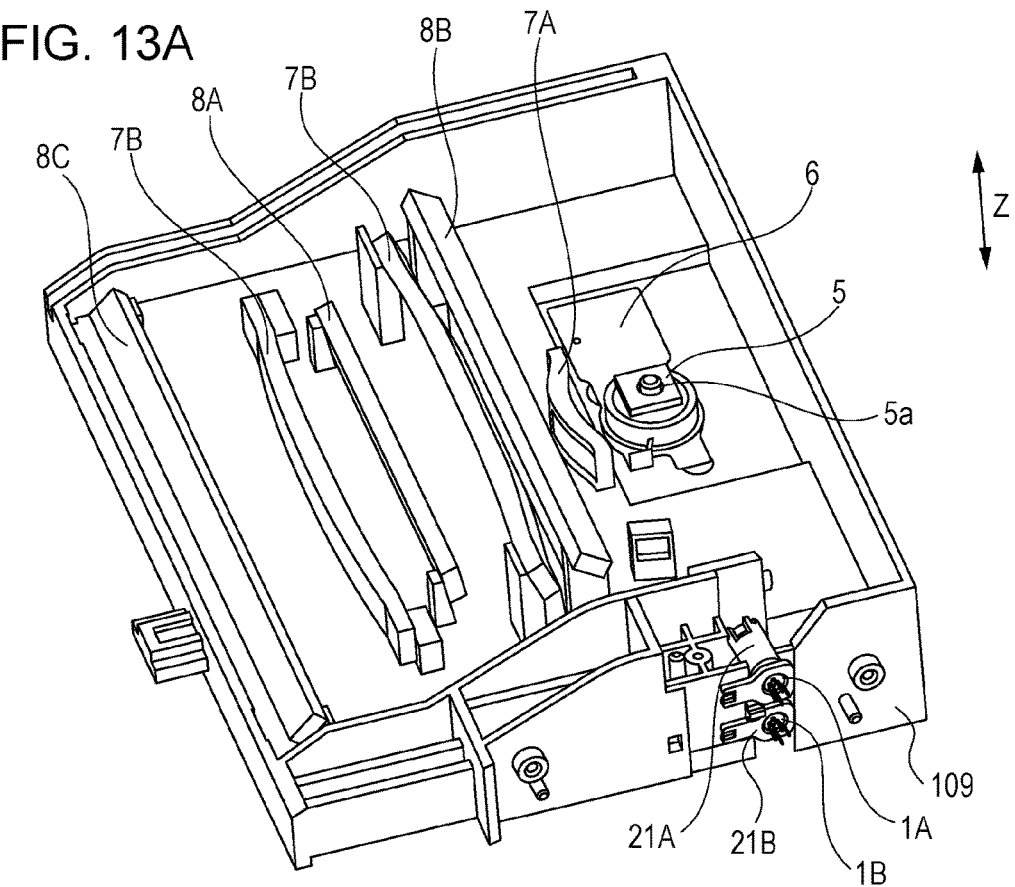
FIG. 13A is a perspective view of an optical box.
Figure 13B:
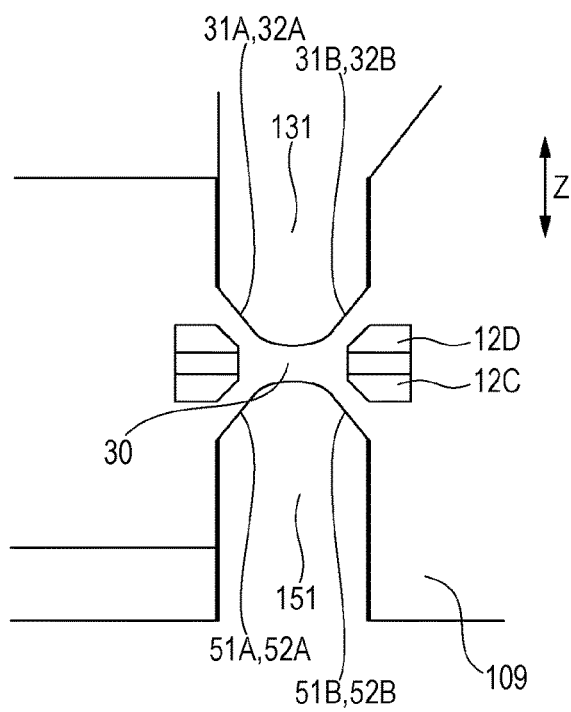
FIG. 13B illustrates a region around abutting portions of the optical box viewed in an optical axis direction.

FIG. 13A is a perspective view of an optical box 109. Although four light source units 21 are positioned with respect to a single optical box 9 in the first embodiment, two light source units 21 (21A and 21B) are positioned with respect to the optical box 109 in the second embodiment. Therefore, only one scanning optical system is supported in the optical box 109 at one side of a rotating polygon mirror 5. FIG. 13B illustrates a region around abutting portions 31A, 31B, 32A, 32B, 51A, 51B, 52A, and 52B of the optical box 109 viewed in the optical axis direction. Also when two light source units 21A and 21B are positioned by a single optical box 109, effects similar to those of the first embodiment can be obtained by forming the abutting portion 31A to 52B on a positioning unit 30.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical scanning apparatus comprising:
   first and second light source units including respective light sources;
   a rotating polygon mirror that performs deflection scanning of laser beams emitted from the light sources of the first and second light source units;
   an optical box accommodating the rotating polygon mirror, the optical box includes:
      a first abutting portion on which the first light source unit abuts configured to position the first light source unit; and
      a second abutting portion on which the second light source unit abuts configured to position the second light source unit;
   a first pressing member pressing the first light source unit toward the first abutting portion to fix the first light source unit to the abutting portion; and
   a second pressing member pressing the second light source unit toward the second abutting portion to fix the second light source unit to the second abutting portion,
   wherein the first and second abutting portions are molded integrally with the optical box
   wherein a first opening is formed in a portion of the optical box opposite to the first abutting portion and a second opening is formed in a portion of the optical box opposite to the second abutting portion in the rotation axis direction,
   wherein a direction in which the first opening is opened and a direction in which the second opening is opened faces away from each other in the rotation axis direction.

2. The optical scanning apparatus according to claim 1, wherein the first and second light source units abut on the first and second abutting portions, respectively, so that the first and second light source units are positioned with respect to the first and second abutting portions in a main scanning direction and a sub-scanning direction.

3. The optical scanning apparatus according to claim 1, wherein the first and second abutting portions have the shapes of V-shaped notches that face away from each other in the rotation axis direction.

4. The optical scanning apparatus according to claim 1, further comprising:
- third and fourth light source units including respective light sources;
- third and fourth abutting portions molded integrally with the optical box and on which third and fourth light source units respectively abut,
- a third pressing member pressing the third light source unit toward the third abutting portion to fix the third light source unit to the third abutting portion, and
- a fourth pressing member pressing the fourth light source unit toward the fourth abutting portion to fix the fourth light source unit to the fourth abutting portion,
- wherein the third and fourth light source units are arranged next to each other in the rotation axis direction of the rotating polygon mirror,
- wherein the first abutting portion and the third abutting portion are arranged next to each other in the main scanning direction, and the second abutting portion and the fourth abutting portion are arranged next to each other in the main scanning direction, and wherein the third and fourth abutting portions are disposed between the third and fourth light source units in the rotation axis direction, and
- wherein a pressing direction by the third pressing member and a pressing direction by the fourth pressing member are faced to each other.

5. The optical scanning apparatus according to claim 1, further comprising:
- a reinforcing member fixed to the optical box at both sides of the openings in the main scanning direction.

6. The optical scanning apparatus according to claim 5, wherein reinforcing member includes the first and second pressing member.

7. The optical scanning apparatus according to claim 6, wherein the reinforcing member includes a substrate including a circuit for causing the first and second light sources to emit light.

8. The optical scanning apparatus according to claim 6, wherein the reinforcing member includes a substrate cover that covers a substrate including a circuit for causing the first and second light sources to emit light.

9. The optical scanning apparatus according to claim 1, wherein each of the first and second light source units includes a plurality of light sources which are capable of emitting light independently.

10. The optical scanning apparatus according to claim 1, wherein a laser beam emitted from the light source of the first light source unit and a laser beam emitted from the light source of the second light source unit are incident on different photoconductors.

* * * * *